(12) United States Patent
Ha et al.

(10) Patent No.: US 9,258,546 B2
(45) Date of Patent: Feb. 9, 2016

(54) THREE-DIMENSIONAL IMAGING SYSTEM AND IMAGE REPRODUCING METHOD THEREOF

(71) Applicant: SAMSUNG ELECTRONICS CO., LTD., Suwon-si (KR)

(72) Inventors: Tae Sin Ha, Seongnam-si (KR); Young Do Kwon, Yongin-si (KR); Kyung Shik Roh, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 366 days.

(21) Appl. No.: 13/762,926

(22) Filed: Feb. 8, 2013

(65) Prior Publication Data

US 2013/0208097 A1 Aug. 15, 2013

(30) Foreign Application Priority Data

Feb. 9, 2012 (KR) .......................... 10-2012-0013057

(51) Int. Cl.
*H04N 13/02* (2006.01)
*H04N 13/00* (2006.01)

(52) U.S. Cl.
CPC ....... *H04N 13/0239* (2013.01); *H04N 13/0025* (2013.01); *H04N 13/0246* (2013.01); *H04N 13/0296* (2013.01)

(58) Field of Classification Search
CPC .......... H04N 13/0239; H04N 21/4223; H04N 13/0242; H04N 13/0203; H04N 13/00; H04N 13/02; G06F 3/0346; G06F 3/038; G06T 2207/10012

USPC ........ 348/46–50, 42; 345/419, 653, 664, 679; 382/154, 285
IPC .............................................. H04N 13/00, 13/02
See application file for complete search history.

(56) References Cited

U.S. PATENT DOCUMENTS

| 8,743,174 B2 * | 6/2014 | Imanishi ......................... 348/42 |
| 2011/0090313 A1 * | 4/2011 | Tsuchita ........................ 348/46 |
| 2012/0062707 A1 * | 3/2012 | Seo et al. ........................ 348/47 |
| 2012/0075431 A1 * | 3/2012 | Ahn et al. ....................... 348/47 |

FOREIGN PATENT DOCUMENTS

| JP | 2006-90961 | 4/2006 |
| KR | 10-2005-0080534 | 8/2005 |

* cited by examiner

*Primary Examiner* — Sherrie Hsia
(74) *Attorney, Agent, or Firm* — Harness, Dickey & Pierce, P.L.C.

(57) ABSTRACT

A three dimensional (3D)imaging system capable of effectively displaying a 3D image suitable for a user by use of different cameras, and an image reproducing method thereof, the 3D imaging system configured to have different cameras freely selected without restriction while enabling the placement of the cameras thereof to be changeable according to the disposition of eyes of the user, so that a 3D image is generated and displayed from a stereo image adapted to the user, and by using the by-user generated 3D image, various contents services including a real time broadcasting, a Contents on Demand (COD), games, and a video communication are provided to a user, so that the fatigue or dizziness of a user is reduced, and the optimum perception of 3D sense is provided.

19 Claims, 10 Drawing Sheets

THREE-DIMENSIONAL IMAGING SYSTEM AND IMAGE REPRODUCING METHOD THEREOF

CROSS-REFERENCE TO RELATED APPLICATIONS

This application claims the priority benefit of Korean Patent Application No. 10-2012-0013057, filed on Feb. 9, 2012 in the Korean Intellectual Property Office, the disclosure of which is incorporated herein by reference.

BACKGROUND

1. Field

Example embodiments of the following disclosure relate to a three-dimensional (3D) imaging system for displaying a 3D image suitable for a user, and an image reproducing method thereof.

2. Description of the Related Art

When an object is viewed through a screen of a television during a movie, for example, or a computer screen during a game, the object, the figure of which is a 3D form, is viewed by a user in a two-dimensional (2D) form due to the flatness of the screen of the television or computer. However, in recent years, various methods have been developed to view an object in the form of a 3D stereoscopic image through a flat (2D) screen.

The 3D stereoscopic image that represents a 3D figure depends on the stereo vision theory through two eyes that enables a 3D sense of an object to be perceived by use of the disparity of two eyes, that is, the binocular disparity caused by the distance of about 65 mm between two eyes. That is, when each of the left eye and the right eye of a user views a respective 2D image that is related to each eye, the images of the two eyes are transmitted to the brain through a retina, and the brain fuses the two images, thereby reproducing the depth perception and the sense of reality.

As described above, in order to view a 3D image of an object from the 2D screen, a left side 3D image viewed from the left eye and a right side 2D image viewed from the right eye are obtained from a stereo camera, and a signal processing is performed on each image, thereby displaying a 3D stereoscopic image.

In general, the stereo camera uses two camera modules each having camera parameters (e.g., the size of the screen, the focus, the brightness, the sense of color, and field of view (FOV)) that are almost same in between the two camera modules in terms of hardware (H/W). In addition, by synchronizing the operation (e.g., capture, white balance and focusing) of the two cameras with each other, the disparity of images generated due to asynchronous operation is restrained at the most. However, the stereo camera manufactured as above is costly and is provided with a lowered freedom of operation, and in particular, has a narrow section of the cameras.

Therefore, there is a need for an improved 3D imaging system.

SUMMARY

Therefore, it is an aspect of the present disclosure to provide a three dimensional (3D) imaging system capable of effectively displaying a 3D image suitable for a user, and an image reproducing method thereof.

Additional aspects of the disclosure will be set forth in part in the description which follows and, in part, will be apparent from the description, or may be learned by practice of the disclosure.

In accordance with one aspect of the present disclosure, a 3D imaging system includes a user input unit, a stereo camera, a control unit and a driving apparatus. The user input unit may be configured to input user information. The stereo camera may be configured to obtain a 2D image. The control unit may be configured to control a pose of the stereo camera according to the user information such that a 3D image suitable for a user is reproduced from the 2D image obtained through the stereo camera. The driving apparatus may be configured to move the stereo camera according to a control of the control unit.

The user information may include information about a disposition of eyes of the user and an eyesight of the user.

The stereo camera may include two cameras each configured to obtain a 2D image.

The two cameras may represent a left side camera and a right side camera each having a different parameter.

The driving apparatus may represent a plurality of motors driven to adjust poses of the left side camera and the right side camera.

The plurality of motors may include a plurality of left side motors configured to move the left side camera in X and Y directions, and a plurality of right side motors configured to move the right side camera in X and Y directions.

The 3D imaging system may further include a user DB configured to store information about a pose of the stereo camera, which is adjusted according to the user information, in a form of a database. The stereo camera may include a left side camera and a right side camera each having a different parameter.

The control unit may update the user DB according to the parameters of the two cameras.

The 3D imaging system may further include an image processing unit and an image generating unit. The image processing unit may be configured to reconstruct a left side image and a right side image by combining images obtained from the two cameras with the information about the pose of the stereo camera. The image generating unit may be configured to generate the 3D image suitable for the user from the reconstructed left and right side images.

The 3D imaging system may further include an image processing unit and an image generating unit. The image processing unit may be configured to reduce a disparity of images obtained from the two cameras by use of the user DB. The image generating unit may be configured to generate the 3D image suitable for the user from the images, which have the disparity thereof reduced, obtained by the two cameras.

The image processing unit may extract regions that overlap between the images obtained by the two cameras, calculate each brightness of the extracted regions to obtain an average of the brightness, and change a brightness of each pixel according to the average, thereby reducing the disparity of the images obtained from the two cameras.

The image processing unit may extract regions that overlap between the images obtained by the two cameras, and adjust a sampling time according to a size of the extracted region, thereby reducing the disparity of the images obtained from the two cameras.

In accordance with another aspect of the present disclosure, a method of reproducing a 3D image based on a stereo camera is as follows. A 2DI image may be obtained through the stereo camera. The 2D image may be adjusted to be suitable for a user by moving the stereo camera. Information about a pose of the stereo camera that is adjusted to be suitable for the user may be stored in a user DB. A 3D image suitable for the user may be output by controlling a pose of the stereo camera according to the information about the pose of the stereo stored in the user DB.

The adjusting of the 2D image to be suitable for the user may be achieved by adjusting the pose of the stereo camera to be suitable for a disposition of eyes of the user and an eyesight of the user.

The stereo camera may include two cameras each having a different parameter.

The method may be achieved by further achieving following. A left side image and a right side image may be reconstructed by combining images obtained from the two cameras with the information about the pose of the stereo camera stored in the user DB. The 3D image suitable for the user may be generated from the reconstructed left and right side images.

The method may be achieved by further performing as follows. Regions that overlap between the images obtained by the two cameras may be extracted. Brightness of each of the extracted regions may be calculated to obtain an average of the brightness. Brightness of each pixel may be changed according to the average, thereby reducing a disparity of the images obtained from the two cameras.

The method may be achieved by further performing as follows. Regions that overlap between the images obtained by the two cameras may be extracted. A sampling time may be adjusted according to a size of the extracted region, thereby reducing a disparity of the images obtained from the two cameras.

In accordance with another aspect of the present disclosure, a method of reproducing a 3D image is provided, the method including: adjusting a placement of a stereo camera according to a disposition of eyes of a user; obtaining at least two 2D images from the stereo camera; and generating the 3D image, based on the obtained 2D images.

As described above, since the stereo camera system is configured to have different cameras, different cameras may be freely selected without restriction. In addition, since the stereo camera system is configured to enable the placement of the cameras thereof to be changeable, a 3D image is generated and displayed from a stereo image adapted to the user by changing the placement of the cameras according to the disposition of eyes of the user. Through such a by-user generated 3D image, various contents services including a real time broadcasting, a Contents on Demand (COD), games, and a video communication are provided to a user, so that the fatigue or dizziness of a user is reduced, and the optimum perception of 3D sense is provided.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Figure 1:
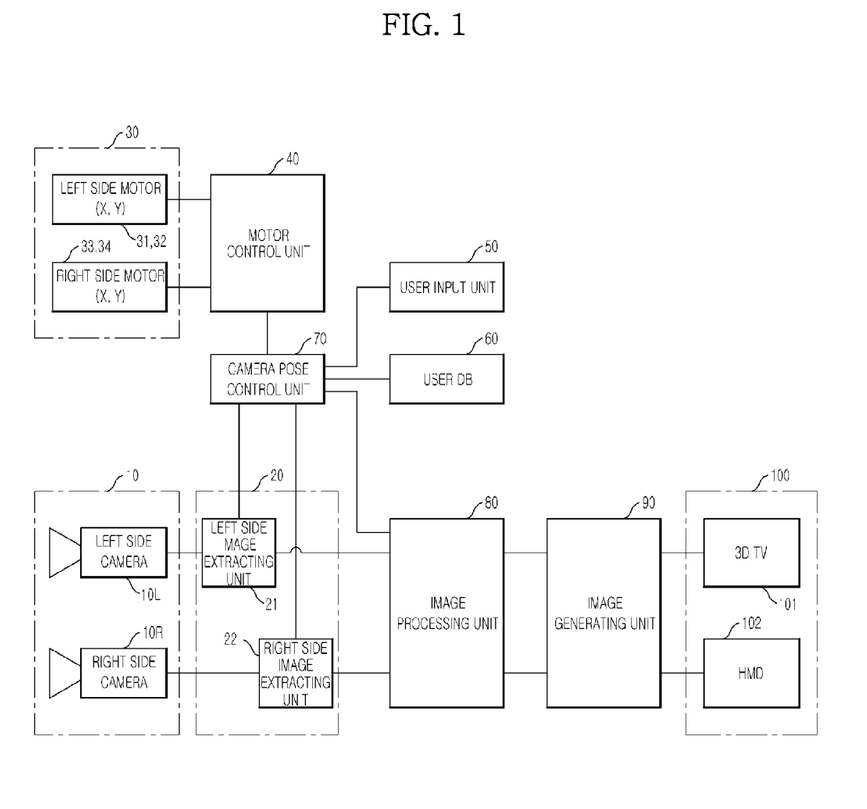
FIG. 1 is a block diagram illustrating the configuration of a three-dimensional (3D) imaging system based on a stereoscopy in accordance with an example embodiment of the present disclosure.

FIG. 1 is a view illustrating the configuration of a three-dimensional (3D) imaging system based on a stereoscopy in accordance with an example embodiment of the present disclosure.

Referring to FIG. 1, a 3D imaging system in accordance with an example aspect of the present disclosure includes a stereo camera 10, an image extracting unit 20, a driving apparatus 30, a motion control unit 40, a user input unit 50, a user database (DB) 60, a camera pose control unit 70, an image processing unit 80, an image generating unit 90, and an image display unit 100.

The stereo camera 10 obtains two-dimensional (2D) images from two cameras 10L and 10R, respectively, and transmits the obtained 2D images to the image extracting unit 20.

Reference numerals L and R denote the left side and the right side of the stereo camera 10, respectively.

Each of the two cameras 10L and 10R has a different parameter, for example, the size of a screen, the focus, the brightness, the sense of color, and field of view (FOV), from each other.

The image extracting unit 20 may represent an image capture module configured to extract an image that has been obtained from the stereo camera 10 (10L and 10R), and includes a left side image extracting unit 21 to extract a left side image obtained from the left side camera 10L and a right side image extracting unit 22 to extract a right side image obtained from the right side camera 10R.

In addition, the left side image extracted by the left side extracting unit 21 and the right side image extracted by the right side extracting unit 22 are transmitted to the image processing unit 80.

The driving apparatus 30 is a motor driven to change the pose, for example, the direction and the position, of the stereo camera 10 (10L and 10R), and includes left side motors 31 and 32 to move the left side camera 10L in X and Y directions, and right side motors 33 and 34 to move the right side camera 10R in X and Y directions.

The motion control unit 40 is a motion control module configured to control the driving apparatus 30 to change the pose, for example, direction and position, of the stereo camera 10 (10L and 10R), and is configured to control the motion of the left side motors 31 and 32 and the right side motors 33 and 34 to move the two cameras 10L and 10R in X and Y directions.

The user input unit 50 is an apparatus configured to input user information about the disposition and characteristics of eyes of a user, for example, the eyesight of eyes.

The user DB 60 may be a database that stores the information about the pose, for example, direction and position, of the camera with respect to the disposition and characteristic of the eyes of the user.

The camera pose control unit 70 is a controller configured to control the pose, for example, direction and position, of the cameras 10L and 10R according to the user information, and is configured to control the pose of the cameras 10L and 10R according to the user information such that two images obtained from the stereo camera 10 (10L and 10R) are suitable for reproducing a 3D image.

In addition, the camera pose control unit 70 may update the user DB 60 by searching for the parameters, for example, the size of the screen, the focus, the sense of color and FOV, that are different in the stereo camera 10 (10L and 10R).

The image processing unit 80 may represent an image matching module configured to reduce the disparity between images obtained from the two cameras 10L and 10L of the stereo camera 10. Further, the image processing unit 80 may be configured to reduce the disparity between images, which is generated due to the asynchronous operation between the two cameras 10L and 10R, by use of the camera parameters obtained from the camera pose control unit 70 and the user information inputted using the user input unit 50.

The image processing unit 80 may transmit the stereo images having the reduced disparity, which is generated due to the asynchronous operation between the two cameras 10L and 10R, to the image generating unit 90. As such, the sense of stereoscopic effect is increased in a process of generating the 3D image from the 2D image.

The image generating unit 80 may a stereoscopic image generator configured to generate a 3D image from the stereo images that have been processed by the image processing unit 80.

The stereoscopic technique for generating a 3D image uses a theory in which 2D images, which are obtained from the two cameras 10L and 10R spaced apart from each other by a distance between two eyes of a human, are alternately viewed at a significantly small period of time, and a brain of the human mistakenly recognizes the 2D images as a 3D image.

The image display unit 100 is a 3D display device configured to reproduce a 3D image generated from the image generating unit 90, and includes a 3D television, and a head mounted display (HMD).

Figure 2:
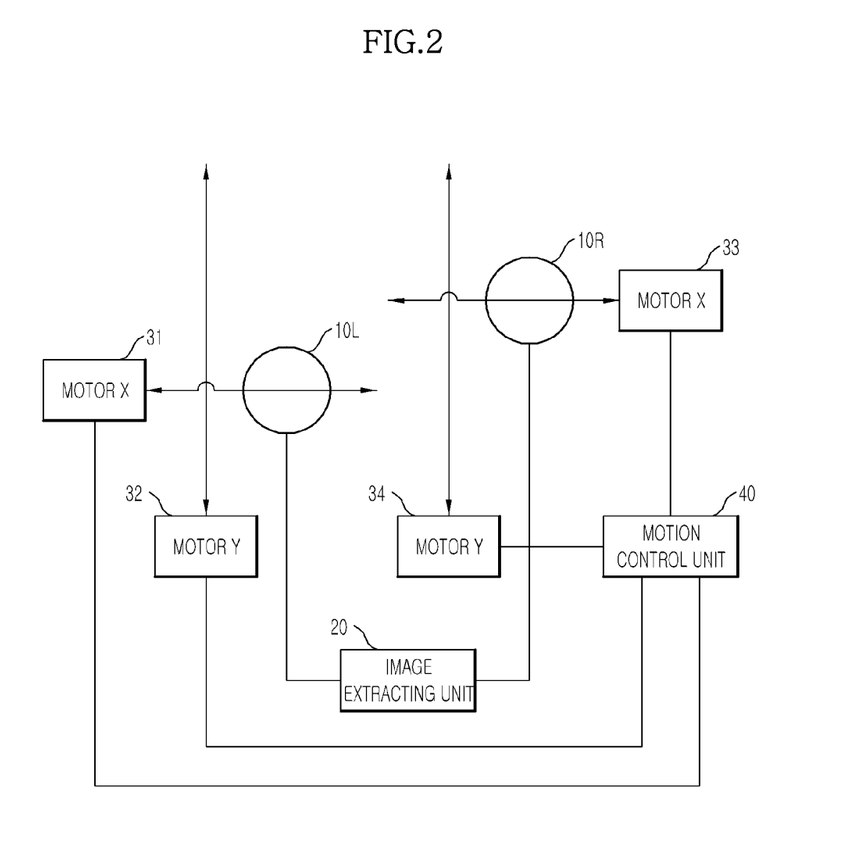
FIG. 2 illustrates the schematic configuration of a driving apparatus configured to move a stereo camera in accordance with an example embodiment of the present disclosure.

FIG. 2 is a view illustrating the schematic configuration of a driving apparatus configured to move a stereo camera in accordance with an example embodiment of the present disclosure.

Referring to FIG. 2, the driving apparatus 30 may include the left side motors 31 and 32 and the right side motors 33 and 34 that are driven to change the pose (direction and position in an X and Y direction) of the stereo camera 10 (10L and 10R).

The left side motors 31 and 32 may include an X-axis left side motor 31 to move the left side camera 10L in the X direction and a Y-axis left side motor 32 to move the left side camera 10L in the Y direction.

The right side motors 33 and 34 include an X-axis right side motor 33 to move the right side camera 10R in the X direction and a Y-axis right side motor 34 to move the right side camera 10R in the Y direction.

The number of the left side motors 31 and 32 and the right side motors 33 and 34 may vary depending on the desired pose of the cameras 10L and 10R for change. For example, in order to change six degrees of freedom, at least six motor is needed, and thus, the present disclosure is not limited to using four motors.

Hereinafter, the operation and effects of the 3D imaging system and the image reproducing method thereof will be described.

Figure 3A:
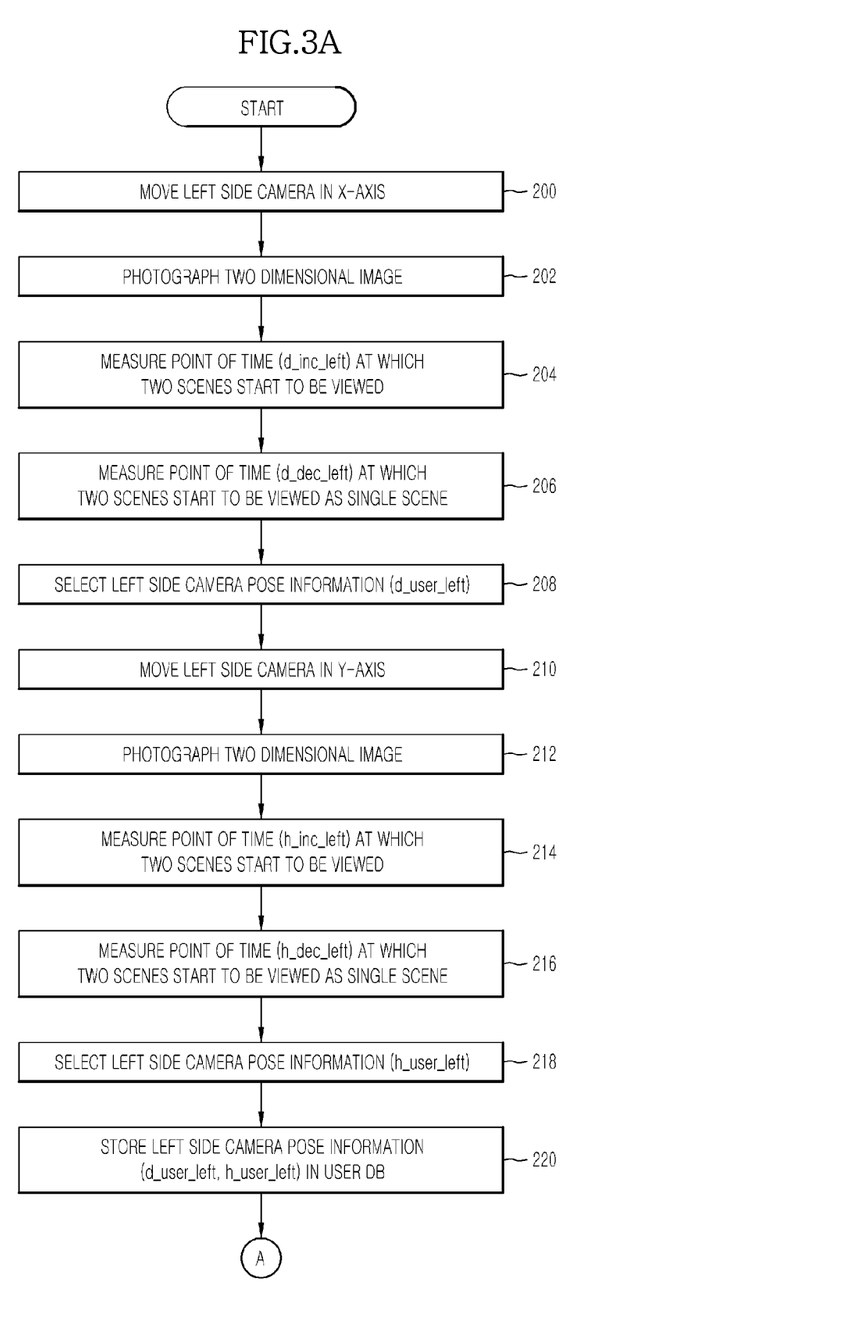
FIGS. 3A and 3B are flow charts illustrating the operation of generating a user database (DB) at the 3D imaging system in accordance with an example embodiment of the present disclosure.
Figure 3B:
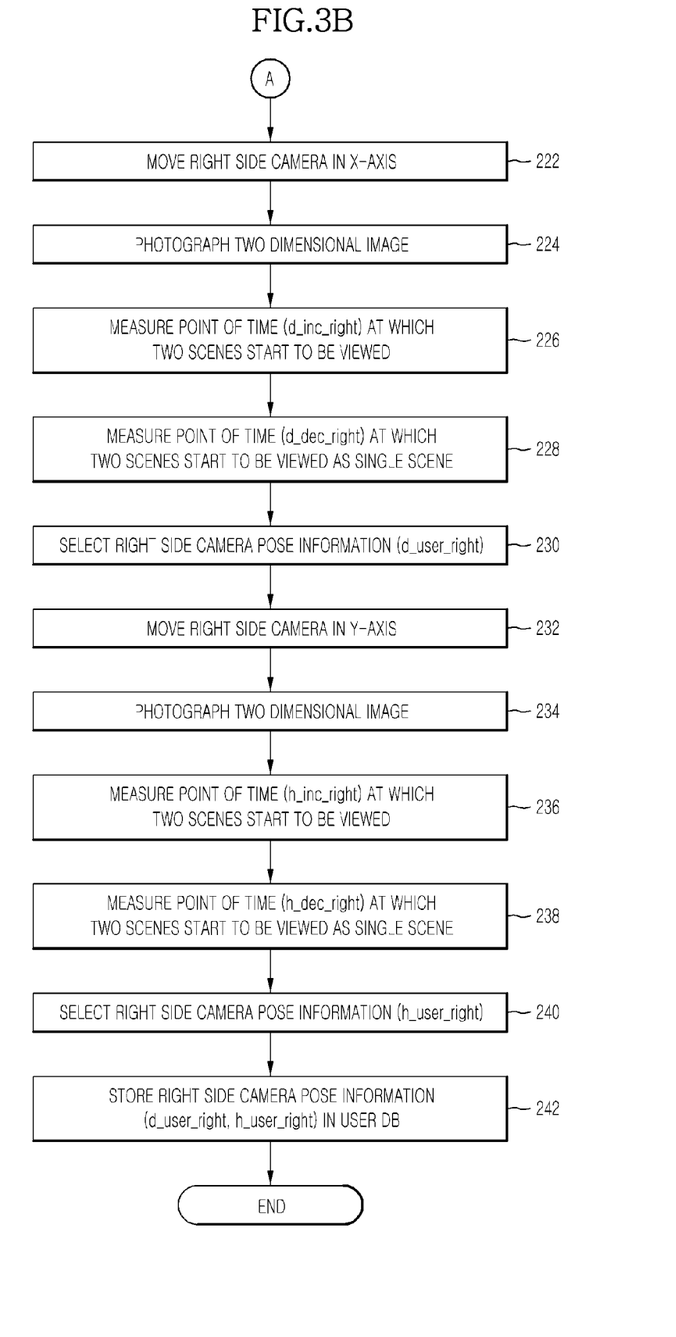

FIGS. 3A and 3B are flow charts illustrating the operation of generating a user DB at the 3D imaging system in accordance with an example embodiment of the present disclosure.

Referring to FIGS. 3A and 3B, the camera pose control unit 70 may select one of the left side camera 10L and the right side camera 10R, and move the selected camera.

First, the following description will be made using the example of the camera pose control unit 70 selecting and moving the left side camera 10L (200). Again, the present disclosure is not limited thereto, and thus, the camera pose control unit 70 may also select and move the right side camera 10R.

The left side camera 10L photographs 2D images at each position to which the left side camera 10L is moved by the camera pose control unit 70, that is, photographs images obtained by the left side camera 10L (202).

A method of photographing 2D images while changing the direction of the left side camera 10L is as follows.

The X-axis left side motor 31 is driven by the motion control unit 40 by the control of the camera pose control unit 70. According to the driving of the X-axis left side motor 31, the left side camera 10L changes the direction thereof while moving in the X-axis direction.

Two dimensional images, which are photographed at a position of the left side eye (hereinafter, referred to as a left eye), among the 2D images photographed by the left side camera 10L as the above are fixed to a left side image channel, while 2D images, which are photographed at a position of the right side eye (hereinafter, referred to as a right eye) among the 2D images photographed by the left side camera 10L as the above are output to the image display unit 100 while changing the position. In this case, the left side camera 10L performs the photographing while maintaining the height thereof.

In the beginning, with respect to the right eye, the image display unit 100 may output the same image as the 2D image photographed at the position of the left eye.

Thereafter, the left side camera 10L outputs the 2D images, which are photographed while slightly moving from the original position to the right side, to the image display unit 100, and at the same time measures a point of time (d_inc_left) at which two scenes start to be viewed by a user (204).

Meanwhile, with respect to the right eye, an image photographed while having the most distant position from the left eye and the same height as the left eye is output.

Thereafter, the motion control unit 40 slightly moves the left side camera 10L to the left side by driving the X-axis left side motor 31. In the course of outputting the 2D images, which are photographed while the left side camera 10L is slightly being moved to the left side, to the display unit 100, a point of time (d_dec_left) at which the scenes start to be viewed as a single scene to the user is measured (206).

Accordingly, the camera pose control unit 70 selects a smaller one d_user_left=min(d_inc_left, d_dec_left) between the point of time d_inc_left at which two scenes start to be viewed by a user, and the point of time d_dec_left at which the scenes start to be viewed as a single scene to the user as a camera pose information (d_user_left) (208).

Thereafter, while changing the height of the left side camera 10L (210), the camera pose control unit 70 photographs 2D images at each position while (212).

A method of photographing 2D images while changing the height of the left side camera 10L is as follows.

The Y-axis left side motor 32 is driven by the motion control unit 40 by the control of the camera pose control unit 70. According to the driving of the Y-axis left side motor 32, the left side camera 10L changes the height thereof while moving in the Y-axis direction.

In the beginning, with respect to the right eye, the image display unit 100 outputs the same image as the 2D image photographed at the position of the left eye.

Thereafter, the left side camera 10L outputs the 2D images, which are photographed while slightly moving from the original position to the upper side, to the image display unit 100, and at the same time, measures a point of time (h_inc_left) at which two scenes start to be viewed by a user (214).

Meanwhile, with respect to the right eye, an image photographed while having the most distant position from the left eye and the same distance between the cameras is output.

Thereafter, the motion control unit 40 slightly moves the left side camera 10L to the lower side by driving the Y-axis left side motor 32. In the course of outputting the 2D images, which are photographed while the left side camera 10L is slightly being moved to the lower side, to the display unit 100, a point of time (h_dec_left) at which the scenes start to be viewed as a single scene to the user is measured (216).

Accordingly, the camera pose control unit 70 selects a smaller one h_user_left=min(h_inc_left, h_dec_left) between the point of time h_inc_left at which two scenes start to be viewed by a user, and the point of time h_dec_left at which the scenes start to be viewed as a single scene to the user as a camera pose information (h_user_left) (218).

The camera pose control unit 70 stores the camera pose information (d_user_left) and the camera pose information (h_user_left), that is, the information, that is, direction and position, about the pose of the left side camera 10L in the user DB 60 (220).

Second, referring to FIG. 3B, the following description will be made using the example of the camera pose control unit 70 selecting and moving the right side camera 10R (222).

The right side camera 10L photographs 2D images at each position that is moved by the camera pose control unit 70, that is, images obtained by the right side camera 10R (224).

A method of photographing 2D images while changing the direction of the right side camera 10R is as follows.

The X-axis right side motor 33 is driven by the motion control unit 40 by the control of the camera pose control unit 70. According to the driving of the X-axis right side motor 33, the right side camera 10R changes the direction thereof while moving in the X-axis direction.

Two dimensional images, which are photographed at a position of the left side eye, among the 2D images photographed by the right side camera 10R as the above are fixed to a left side image channel, while 2D images, which are photographed at a position of the right side eye, among the 2D images photographed by the right side camera 10R as the above are output to the image display unit 100 while changing the position. In this case, the right side camera 10R photographs the 2D images while maintaining the height thereof.

In the beginning, with respect to the right eye, the image display unit 100 outputs the same image as the 2D image photographed at the position of the left eye.

Thereafter, the right side camera 10R outputs the 2D images, which are photographed while slightly moving from the original position to the right side, to the image display unit 100, and at the same time, measures a point of time (d_inc_right) at which two scenes start to be viewed by a user (226).

Meanwhile, with respect to the right eye, an image photographed while having the most distant position from the left eye and the same height as the left eye is output.

Thereafter, the motion control unit 40 slightly moves the right side camera 10R to the left side by driving the X-axis right side motor 33. In the course of outputting the 2D images, which are photographed while the right side camera 10R is slightly being moved to the left side, to the display unit 100, a point of time (d_dec_right) at which the scenes start to be viewed as a single scene to the user is measured (228).

Accordingly, the camera pose control unit 70 selects a smaller one d_user_right=min(d_inc_right, d_dec_right) between the point of time d_inc_right at which two scenes start to be viewed by a user, and the point of time d_dec_right at which the scenes start to be viewed as a single scene to the user as a camera pose information (d_user_right) (230).

Thereafter, while changing the height of the right side camera 10R (232), the camera pose control unit 70 photographs 2D images at each position (234).

A method of photographing 2D images while changing the height of the right side camera 10R is as follows.

The Y-axis right side motor 34 is driven by the motion control unit 40 by the control of the camera pose control unit 70. According to the driving of the Y-axis right side motor 34, the right side camera 10R changes the height thereof while moving in the Y-axis direction.

In the beginning, with respect to the right eye, the image display unit 100 outputs the same image as the 2D image photographed at the position of the left eye.

Thereafter, the right side camera 10R outputs the 2D images, which are photographed while slightly moving from the original position to the upper side, to the image display unit 100, and at the same time, measures a point of time (h_inc_right) at which two scenes start to be viewed by a user (236).

Meanwhile, with respect to the right eye, an image photographed while having the most distant position from the left eye and the same distance between the cameras is output.

Thereafter, the motion control unit 40 slightly moves the right side camera 10R to the lower side by driving the Y-axis right side motor 34. In the course of outputting the 2D images, which are photographed while the right side camera 10R is slightly being moved to the lower side, to the display unit 100, a point of time (h_dec_right) at which the scenes start to be viewed as a single scene to the user is measured (238).

Accordingly, the camera pose control unit 70 selects a smaller one h_user_right=min(h_inc_right, h_dec_right) between the point of time h_inc_right at which two scenes start to be viewed by a user, and the point of time h_dec_right at which the scenes start to be viewed as a single scene to the user as a camera pose information (h_user_right) (240).

The camera pose control unit 70 stores the camera pose information (d_user_right) and the camera pose information (h_user_right), that is, the information, for example, direction and position, about the pose of the right side camera 10R in the user DB 60 (242).

Figure 4:
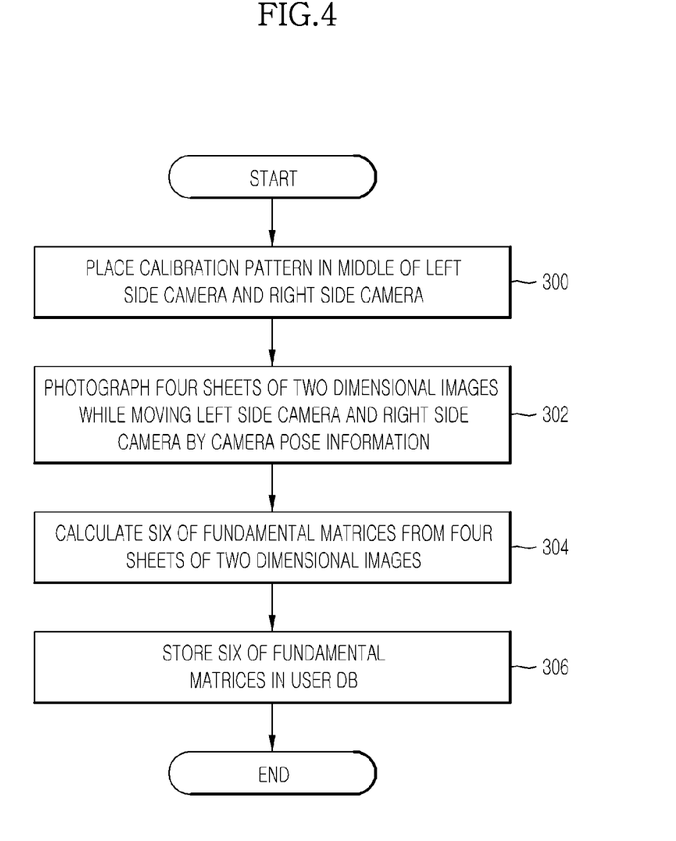
FIG. 4 is a flow chart illustrating the operation of performing a camera calibration at the 3D imaging system in accordance with an example embodiment of the present disclosure.
Figure 5:
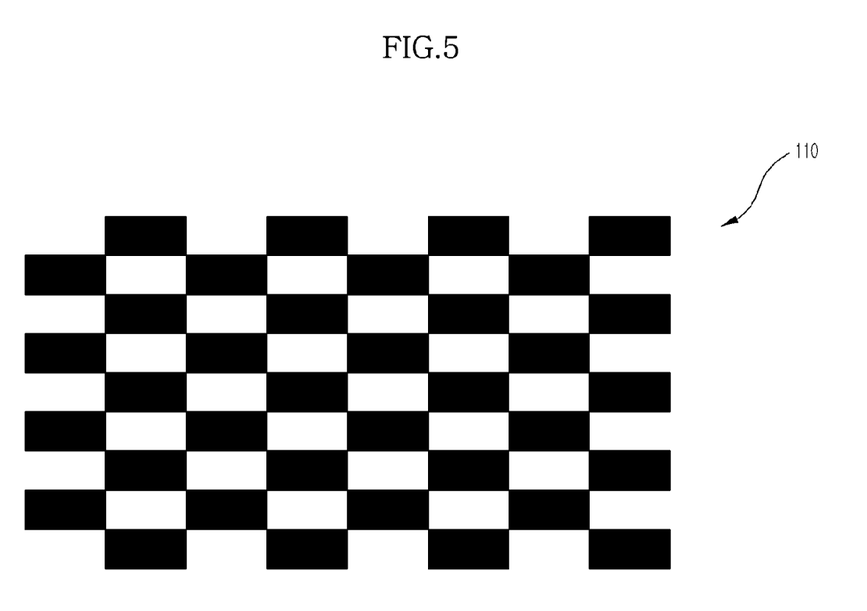
FIG. 5 is a view illustrating a calibration pattern for the camera calibration of FIG. 4.
Figure 6:
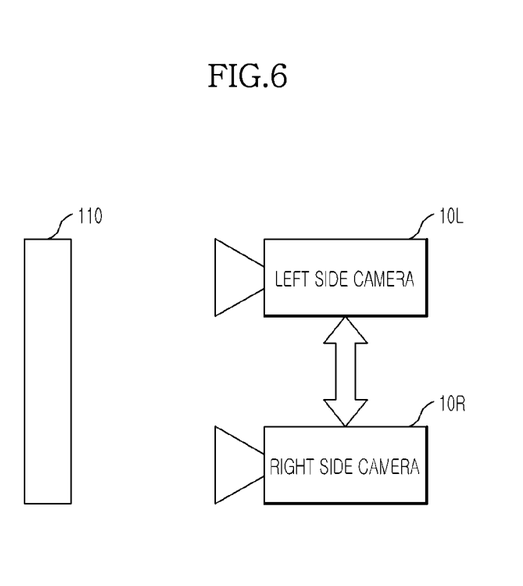
FIG. 6 is a view illustrating the calibration pattern of FIG. 5 placed in the middle of the stereo camera.

FIG. 4 is a flow chart illustrating the operation of performing a camera calibration at the 3D imaging system in accordance with an example embodiment of the present disclosure. FIG. 5 is a view illustrating a calibration pattern for the camera calibration of FIG. 4. FIG. 6 is a view illustrating the calibration pattern of FIG. 5 placed in the middle of the stereo camera.

Referring to FIG. 6, first, a calibration pattern 110 shown on FIG. 5 is placed in the middle of the left side camera 10L and the right side camera 10R (300).

Thereafter, the left side camera 10L and the right side camera 10R photograph four sheets of the 2D images while moving by the camera pose information (d_user_left, h_user_left) and the camera pose information (d_user_right, h_user_right) that are stored in the user DB 60, respectively (302).

The total of four images includes (a) a 2D image photographed at the original position of the right side camera 10R, (b) a 2D image photographed by the right side camera 10R at the position of the left side camera 10L, (c) a 2D image photographed at the original position of the left side camera 10L, and (d) a 2D image photographed by the left side camera 10L at the position of the right side camera 10R.

Accordingly, the camera pose control unit 70 obtains six of fundamental matrices from the four sheets of the 2D images (304), and stores the obtained six of fundamental matrices in the user DB 60 (306).

The six of fundamental matrices includes M1:(a)-(b), M2: (a)-(c), M3:(a)-(d), M4:(b)-(c), M5:(b)-(d), and M6: (c)-(d).

In general, since the state of two eyes, for example, the eyesight, and the disposition of two eyes are different for each person, the disposition and the eyesight of a viewer need to be considered to effectively reproduce a 3D image. Having the eyesight and the disposition of eyes considered in reproducing a 3D image will be described with reference to FIG. 7.

Figure 7:
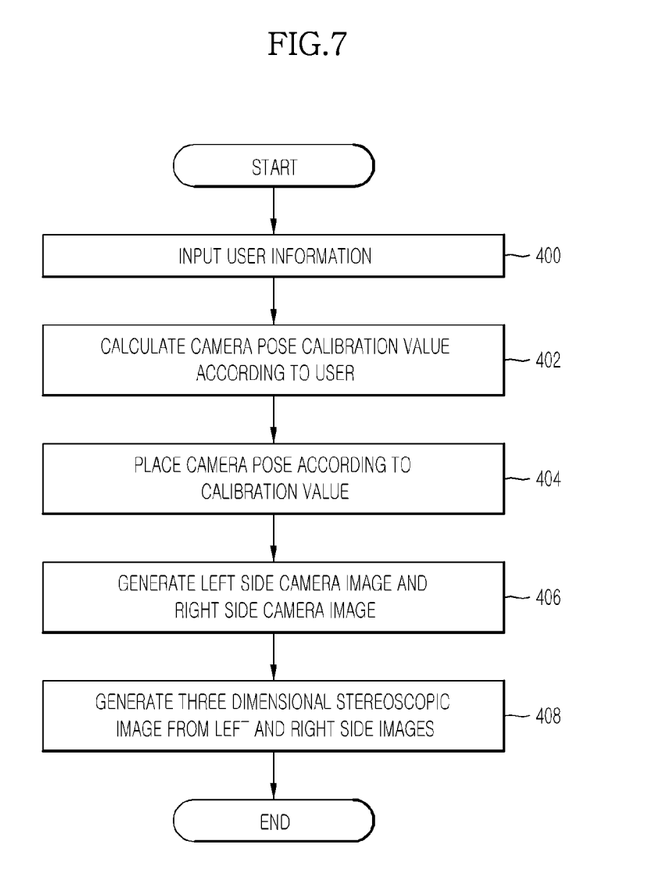
FIG. 7 is a flow chart illustrating a method of outputting a 3D image by controlling the pose of a camera according to the user information at the 3D imaging system in accordance with an example embodiment of the present disclosure.

FIG. 7 is a flow chart illustrating a method of outputting a 3D image by controlling the pose of a camera according to the user information at the 3D imaging system in accordance with an example embodiment of the present disclosure.

Referring to FIG. 7, a user inputs user information through the user input unit 50 (400). The user information is to consider the disposition and the eyesight of human that vary with each person.

If the user inputs the user information, the camera pose control unit 70 obtains a camera pose calibration value depending on the user, for example, the camera pose information (d_user_left, h_user_left) and the camera pose information (d_user_right, h_user_right) from the user DB 60 (402).

Subsequently, the camera pose control unit 70 places the camera pose according to the camera pose calibration value obtained from the user DB 60 (404).

If the camera pose is placed according to the camera pose calibration value, the image generating unit 90 generates a reconstructed left side camera image (I_new_left) as shown the following equation 1. Further, the reconstructed left side camera image is (I_new_left) obtained by combining an image (I_left) input from the left side camera 10L with an image that is converted from an image (I_right) input by the right side camera 10R through the fundamental matrix M1 obtained from the user DB 60.

$$I\_new\_left = w*I\_left + (1-w)*I\_right*M1 \text{ (}w\text{ is a value between 0 and 1)} \quad \text{[Equation 1]}$$

Similarly, the image generating unit 90 generates a reconstructed right side camera image (I_new_right) as shown the following equation 2, the reconstructed right side camera image (I_new_right) obtained by combining an image (I_right) input from the right side camera 10R with an image that is converted from an image (I_left) input by the left side camera 10L through the fundamental matrix M6 obtained from the user DB 60.

$$I\_new\_right = w*I\_right + (1-w)*I\_left*M6 \text{ (}w\text{ is a value between 0 and 1)} \quad \text{[Equation 2]}$$

Accordingly, the image generating unit 70 generates a 3D stereoscopic image from the reconstructed left side and right side camera images (I_new_left) and (I_new_right), and outputs the generated 3D stereoscopic image to the image display unit 100 (408).

As described above, as the stereo camera system capable of changing the pose of the cameras 10L and 10R is constructed, the 3D image is output by controlling the pose of the cameras 10L and 10R according to the disposition of the eyes of the user and, so that the 3D stereoscopic image suitable for the user is displayed, thereby reducing the fatigue and dizziness of eyes, and thus, proving the optimum sense of 3D perception.

However, since the 3D imaging system in accordance with an example embodiment of the present disclosure uses the two cameras 10L and 10R each having a different parameter in order to widen the selection of cameras and to implement a cost effective stereo camera, a constraint may occur as a result of the asynchronous operation of the different two cameras 10L and 10R.

Accordingly, the 3D imaging system in accordance with an example embodiment of the present disclosure suggests a method of reducing the disparity between images by performing an image processing on images that are obtained from the different cameras 10L and 10R in an asynchronous scheme. The method will be described with reference to FIGS. 8 and 9.

Figure 8:
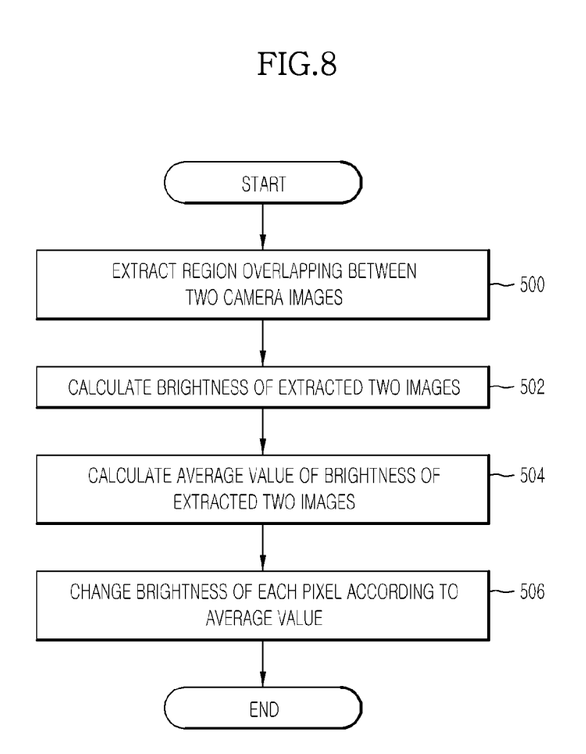
FIG. 8 is a flow chart illustrating a first method of reducing the disparity of images generated due to the asynchronous operation between two cameras at the 3D imaging system in accordance with an example embodiment of the present disclosure.

FIG. 8 is a flow chart illustrating an example method of reducing the disparity of images generated due to the asynchronous operation between two cameras at the 3D imaging system in accordance with an example embodiment of the present disclosure.

In a case where the two cameras 10L and 10R individually supports an auto-white balancing, even if the two cameras 10L and 10R are the same camera module having the same camera parameter, the images obtained from the two cameras 10L and 10R produce a disparity. Accordingly, the brightness, for example, may need to be matched between the images.

Referring to FIG. 8, the image processing unit 80 extracts regions, at which the two camera images overlap, from the two camera images (500). In this case, if the region is smaller than a threshold area, the matching of brightness is not performed.

Thereafter, the image processing unit 80 calculates the brightness of each of the extracted two images (502), and calculates the average value of brightness of the extracted two images (504).

Accordingly, the image processing unit 80 changes the brightness of each pixel to have the calculated average value (506).

In addition, the image processing unit 80 changes the brightness of each pixel of the remaining region, which does not overlaps between the two camera images, based on the calculated average value of brightness.

Accordingly, the image generating unit 80 generates a 3D stereoscopic image with respect to the images that are obtained by changing the brightness of each pixel based on the calculated average brightness, and outputs the generated 3D stereoscopic image to the image display unit 100.

Figure 9:
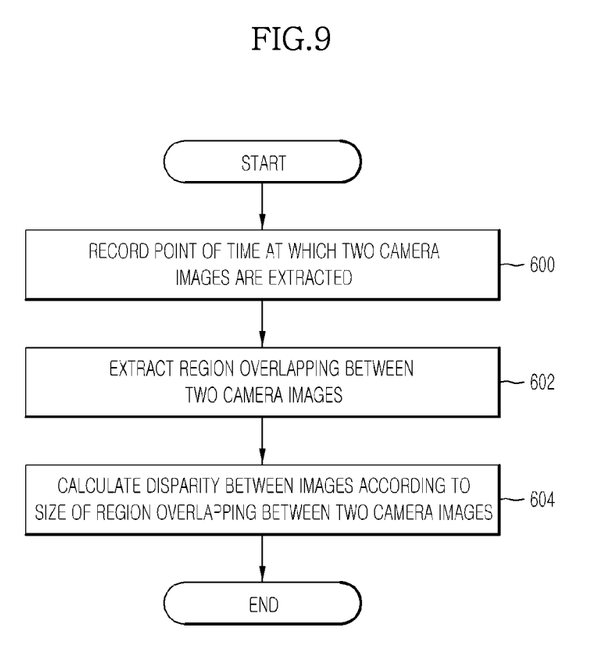
FIG. 9 is a flow chart illustrating a second method of reducing the disparity of images generated due to the asynchronous operation between two cameras at the 3D imaging system in accordance with an example embodiment of the present disclosure.

FIG. 9 is a flow chart illustrating another method of reducing the disparity of images generated due to the asynchronous operation between two cameras at the 3D imaging system in accordance with an example embodiment of the present disclosure.

In a case where the two cameras 10L and 10R have different sampling times from each other, a disparity between two images occurs. Accordingly, the disparity of sampling time is resolved through conversion between the two cameras 10L and 10R.

Referring to FIG. 9, at the same time when the image extracting unit 20 extracts images, a time stamp is also recorded.

In a case where the time at which the images, which are obtained from the two cameras 10L and 10R, are extracted most recently are referred to as t_l and t_r, respectively (600), an image obtained at a point of time t (t(t>t_l, t>t_r)) is calculated as follows.

First, when regions that overlap between the two camera images are extracted (602), if the size of the region is smaller than a threshold area, the disparity of the images is calculated through the following equation 3 (604).

$$-I\_l(t)=I\_l(t\_l)$$

$$-I\_r(t)=I\_r(t\_r) \quad [\text{Equation 3}]$$

Second, when regions that overlap between the two camera images are extracted (602), if the size of the region is larger than a threshold area and t_l>t_r, the disparity of the images is calculated through the following equation 4 (604).

$$-I\_l(t)=I\_l(t\_l)$$

$$-I\_r(t) \quad [\text{Equation 4}]$$

Herein, the region overlapping is equal to w*I_l(t_l)*M6+ (1−w)*I_r(t_r), in which w is a value between 0 and 1, and, the region not overlapping is obtained based on (1−w)*I_r (t_r), in which w approximates to 0 while approaching to a boundary.

Third, when regions that overlap between the two camera images are extracted (602), if the size of the region is larger than a threshold area and t_r>t_l, the disparity of the images is calculated through the following equation 5 (604).

$$-I\_r(t)=I\_r(t\_r)$$

$$-I\_l(t) \quad [\text{Equation 5}]$$

Herein, the region overlapping is equal to w*I_r(t_r)*M1+ (1−w)*I_l(t_l), in which w is a value between 0 and 1, and the region not overlapping is obtained based on (1−w)*I_l(t_l), in which w approximates to 0 while getting farther away from a boundary.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A three-dimensional (3D) imaging system, comprising:
a user input unit configured to input user information;
a stereo camera including at least two cameras each configured to obtain a two-dimensional (2D) image;
a control unit configured to control positions of the at least two cameras in X and Y directions according to the user information, such that a 3D image suitable for a user is reproduced from the 2D images obtained using the at least two cameras; and
a driving apparatus configured to move the at least two cameras in the X and Y directions according to a control of the control unit.

2. The 3D imaging system of claim 1, wherein the user information comprises information about a disposition of left and right eyes of the user and an eyesight of the user.

3. The 3D imaging system of claim 1, wherein the at least two cameras represent a left side camera and a right side camera each camera having a different parameter.

4. The 3D imaging system of claim 3, wherein the driving apparatus comprises a plurality of motors configured to be driven to adjust the positions of the left side camera and the right side camera.

5. The 3D imaging system of claim 4, wherein the plurality of motors comprises a plurality of left side motors configured to move the left side camera in the X and Y directions, and a plurality of right side motors configured to move the right side camera in the X and Y directions.

6. The 3D imaging system of claim 1, further comprising a user database (DB) configured to store information about a position of the stereo camera, which is adjusted according to the user information, wherein the at least two cameras each have a different parameter.

7. The 3D imaging system of claim 6, wherein the control unit is configured to update the user DB according to the parameters of the at least two cameras.

8. The 3D imaging system of claim 6, further comprising:
an image processing unit configured to reconstruct a left side image and a right side image by combining the 2D images obtained from the at least two cameras, respectively, with the information about the position of the stereo camera; and
an image generating unit configured to generate the 3D image suitable for the user from the reconstructed left and right side images.

9. The 3D imaging system of claim 8, wherein the control unit is configured to select, as a camera position information, a smaller one between a point of time at which two scenes start to be viewed by the user, and a point of time at which the two scenes start to be viewed as a single scene to the user.

10. The 3D imaging system of claim 6, further comprising:
an image processing unit configured to reduce a disparity of the 2D images obtained from the at least two cameras using the user DB; and
an image generating unit configured to generate the 3D image suitable for the user from the 2D images, which have the disparity thereof reduced, obtained by the at least two cameras.

11. The 3D imaging system of claim 10, wherein the image processing unit is configured to extract regions that overlap between the 2D images obtained by the two cameras, calculate each brightness of the extracted regions to obtain an average of the brightness, and change a brightness of each pixel according to the average, thereby reducing the disparity of the 2D images obtained from the two cameras.

12. The 3D imaging system of claim 8, wherein the image processing unit is configured to extract regions that overlap between the 2D images obtained by the two cameras, and adjust a sampling time according to a size of the extracted region, thereby reducing the disparity of the 2D images obtained from the two cameras.

13. A method of reproducing a 3D image based on a stereo camera, the method comprising:
obtaining 2D images through at least two cameras of the stereo camera;
adjusting the 2D images to be suitable for a user by moving the at least two cameras in X and Y directions;

storing information about a position of the stereo camera that is adjusted to be suitable for the user in a user database (DB); and outputting a 3D image suitable for the user by controlling a position of the stereo camera according to the information about the position of the stereo stored in the user DB.

14. The method of claim 13, wherein the adjusting of the 2D images to be suitable for the user comprises adjusting the position of the stereo camera to be suitable for a disposition of eyes of the user and an eyesight of the user.

15. The method of claim 13, wherein the at least two cameras each have a different parameter.

16. The method of claim 15, further comprising:

reconstructing a left side image and a right side image by combining the 2D images obtained from the two cameras with the information about the position of the stereo camera stored in the user DB; and generating the 3D image suitable for the user from the reconstructed left and right side images.

17. The method of claim 16, further comprising:

extracting regions that overlap between the 2D images obtained by the at least two cameras;

calculating each brightness of the extracted regions to obtain an average of the brightness, and changing a brightness of each pixel according to the average, thereby reducing a disparity of the 2D images obtained from the two cameras.

18. The method of claim 16, further comprising extracting regions that overlap between the 2D images obtained by the at least two cameras, and adjusting a sampling time according to a size of the extracted region, thereby reducing a disparity of the 2D images obtained from the at least two cameras.

19. A method of reproducing a 3D image, the method comprising:

adjusting, in X and Y directions, a placement of at least two cameras of a stereo camera according to a disposition of eyes of a user;

obtaining at least two 2D images from the stereo camera; and generating the 3D image, based on the obtained 2D images.

\* \* \* \* \*